UNITED STATES PATENT OFFICE.

HARRY C. KERR, OF KANSAS CITY, MISSOURI.

POLISHING COMPOSITION AND MAKING SAME.

1,397,102.  Specification of Letters Patent.  Patented Nov. 15, 1921.

No Drawing.  Application filed May 26, 1921. Serial No. 472,895.

*To all whom it may concern:*

Be it known that I, HARRY C. KERR, a citizen of the United States, residing at Kansas City, in the county of Jackson and State of Missouri, have invented a certain new and useful Improvement in Polishing Compositions and Making Same, of which the following is a specification.

My invention relates to improvements in compositions of matter and making same adapted for cleaning, varnishing and polishing painted or varnished surfaces.

It is particularly well adapted for use on varnished, painted or enameled automobile bodies.

The object of my invention is to provide a novel composition of the kind described, which is cheaply and easily made, of readily obtainable material, which can be easily applied, which requires little rubbing to obtain a fine polished surface, which will clean off the grease, oil and dirt and apply a coat of varnish, and which is lasting in its effects.

The novel features of my invention are hereinafter fully described and claimed.

In carrying my invention into effect, benzin and paraffin oil are mixed together in proportion, by liquid measure, of substantially twenty-five parts each.

Any suitable varnish is mixed with turpentine in proportions substantially of twelve and one half parts of varnish and thirty-seven and one half parts of turpentine, liquid measure.

After the paraffin oil and varnish have been respectively thinned with the benzin and turpentine, the two mixtures are mixed together. The resultant mixture is then ready to apply to a painted, varnished or enameled surface. The composition will clean off the grease, dirt or oil and a coat of varnish mixed with paraffin will be left on the surface after the benzin and turpentine have evaporated. The composition dries very quickly and with slight rubbing imparts a fine polish to the surface. Any varnish adapted for use exteriorly on wood or metal may be employed in the manufacture of the composition.

By first thinning the varnish with turpentine and then thinning the paraffin oil with benzin and finally mixing together the two mixtures, gumming together of the varnish is avoided. The presence in the composition of the paraffin oil performs the double function of affording a fine polish to the surface and effecting a quick drying of the varnish which the turpentine alone would not effect.

What I claim is:—

1. A polishing composition, adapted for cleaning, varnishing and polishing a painted or varnished surface comprising the following enumerated elements mixed together in the proportions specified, substantially the proportions specified, liquid measure, benzin twenty-five parts, turpentine thirty-seven and a half parts, varnish twelve and a half parts, and paraffin oil twenty five parts, substantially as set forth.

2. The method of making a polishing composition consisting in mixing together twenty five parts, liquid measure, of benzin with twenty five parts paraffin oil, mixing together turpentine thirty seven and a half parts, liquid measure, with varnish twelve and a half parts, and then mixing together the two mixtures, substantially as set forth.

3. A polishing composition consisting of varnish thinned with turpentine and mixed with paraffin oil thinned with benzin, substantially as set forth.

In testimony whereof I have signed my name to this specification.

HARRY C. KERR.